United States Patent
Sekiguchi

(10) Patent No.: US 8,279,085 B2
(45) Date of Patent: Oct. 2, 2012

(54) VEHICLE-MOUNTED DEVICE AND INFORMATION DISTRIBUTION SYSTEM

(75) Inventor: Satoru Sekiguchi, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 323 days.

(21) Appl. No.: 12/808,441

(22) PCT Filed: Dec. 17, 2008

(86) PCT No.: PCT/JP2008/072987
§ 371 (c)(1),
(2), (4) Date: Jun. 16, 2010

(87) PCT Pub. No.: WO2009/081818
PCT Pub. Date: Jul. 2, 2009

(65) Prior Publication Data
US 2011/0298636 A1    Dec. 8, 2011

(30) Foreign Application Priority Data
Dec. 21, 2007    (JP) .................................. 2007-330511

(51) Int. Cl.
*G08G 1/0967*    (2006.01)
(52) U.S. Cl. .................... 340/905; 340/995.13; 701/400
(58) Field of Classification Search .................. 340/905, 340/995.1, 995.12, 995.13, 996, 901; 701/201, 701/400, 428, 441
See application file for complete search history.

(56) References Cited

U.S. PATENT DOCUMENTS 5,508,917 A * 4/1996 Siegle et al. ................... 701/428
5,819,198 A * 10/1998 Peretz ............................ 701/117
(Continued)

FOREIGN PATENT DOCUMENTS

FR    2 655 456    6/1991
(Continued)

OTHER PUBLICATIONS

Supplementary European Search Report (Application No. 08865020.5) dated May 22, 2012.
(Continued)

*Primary Examiner* — Toan N Pham
(74) *Attorney, Agent, or Firm* — Eric J. Robinson; Robinson Intellectual Property Law Office, P.C.

(57) ABSTRACT

An information distribution system comprises a roadside apparatus, a center apparatus, and a vehicle-mounted device. The center apparatus transmits to a predetermined area through the roadside apparatus first distribution information including a predetermined division number for identifying a road where the roadside apparatus are installed or second distribution information including speech information, a division number, and execution condition information for executing the speech information depending on the division number included in the first distribution information and that included in the second one. The vehicle-mounted device has a DSRC unit for receiving the first or second distribution information, a storage unit for storing the first or second distribution information, a reproduction unit for executing the speech information, and a control unit for judging on the basis of the execution condition information whether or not it is possible to execute the speech information and allowing the reproduction unit to execute the speech information depending on the result of the judgment. Provision of erroneous information due to leakage of a radio wave arriving from a direction different from the moving direction of the vehicle equipped with the vehicle-mounted device is prevented, and information corresponding to the moving direction of the vehicle.

5 Claims, 10 Drawing Sheets

U.S. PATENT DOCUMENTS

| | | | |
|---|---|---|---|
| 5,839,086 A * | 11/1998 | Hirano | 701/420 |
| 6,466,862 B1 * | 10/2002 | DeKock et al. | 701/117 |
| 6,943,702 B2 * | 9/2005 | Kato | 340/988 |
| 7,427,928 B2 * | 9/2008 | Crocker et al. | 340/902 |
| 8,165,748 B2 * | 4/2012 | Goto et al. | 701/36 |

FOREIGN PATENT DOCUMENTS

| | | |
|---|---|---|
| JP | 10-082648 | 3/1998 |
| JP | 10-122870 | 5/1998 |
| WO | WO 03/005322 | 1/2003 |

OTHER PUBLICATIONS

Notification of Transmittal of Translation of the International Preliminary Report on Patentability (Application No. PCT/JP2008/072987) dated Jul. 29, 2010.

International Search Report for Application Serial No. PCT/JP2008/072987.

Written Notification of Reason for Refusal (Application No. 2007-330511) dated Jul. 3, 2012.

* cited by examiner

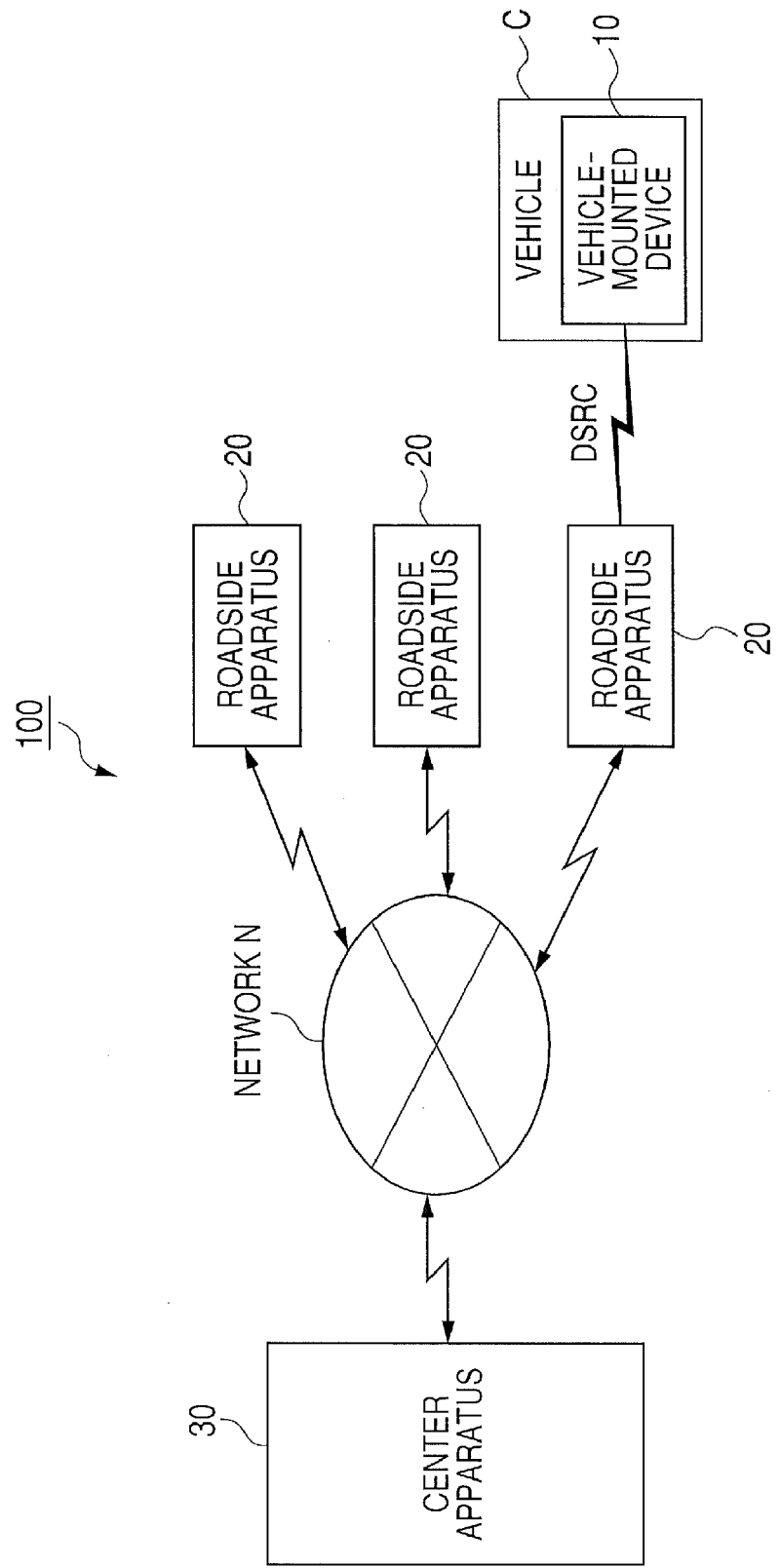

FIG. 2A

| DIVISION NUMBER | PRESET VALUE FOR IDENTIFYING ROAD |
|---|---|
| VALID TERM | VALID TERM FOR DIVISION NUMBER (SECONDS, MINUTES, INFINITY ∞, AND THE LIKE) |
| DIVISION NUMBER SETTING INDICATION INFORMATION | INDICATION INFORMATION FOR SETTING DIVISION NUMBER AND VALID TERM |

FIG. 2B

| CONTENT INFORMATION | INFORMATION TRANSMITTED BY ROADSIDE APPARATUS AND PROVIDED TO USER |
|---|---|
| DIVISION NUMBER | PRESET VALUE FOR IDENTIFYING ROAD |
| EXECUTION CONDITION INFORMATION | CONDITION FOR EXECUTION OF HIGH-PRIORITY CONTENT INFORMATION, CONDITION FOR EXECUTION OF CONTENT INFORMATION BASED ON COINCIDENCE DEGREE BETWEEN DIVISION NUMBER IN FIRST DISTRIBUTION INFORMATION AND DIVISION NUMBER IN SECOND DISTRIBUTION INFORMATION, AND CONDITION FOR EXECUTION OF CONTENT INFORMATION BASED ON CONDITION FOR VALID TERM |

FIG. 3

| | INFORMATION PROVISION TIME (HOURS) |
|---|---|
| CURRENT POSITION INFORMATION | INFORMATION PROVISION TIME (MINUTES) |
| | INFORMATION PROVISION ORIENTATION PRESENCE FLAG |
| | INFORMATION PROVISION ORIENTATION |
| | ROAD TYPE |
| | ORIENTATION CODE |
| | ... |

| SERVICE SPEED ON ROAD |
|---|

D1 {

| | | NUMBER OF INFORMATION BYTES |
|---|---|---|
| | | NUMBER OF AUDIO INFORMATION TYPES |
| UTTERANCE INFORMATION | VOICE 1 | NUMBER OF INFORMATION BYTES |
| | | ... |
| | | LANGUAGE DISCRIMINATION FLAG |
| | | AUDIO FORMAT DISCRIMINATION FLAG |
| | | FILE INFORMATION STORAGE UNIT (SPEECH READING-OUT INFORMATION) |
| | ... | |
| | VOICE 1 | NUMBER OF INFORMATION BYTES |
| | | ... |
| | | LANGUAGE DISCRIMINATION FLAG |
| | | AUDIO FORMAT DISCRIMINATION FLAG |
| | | FILE INFORMATION STORAGE UNIT (SPEECH READING-OUT INFORMATION) |

US 8,279,085 B2

VEHICLE-MOUNTED DEVICE AND INFORMATION DISTRIBUTION SYSTEM

TECHNICAL FIELD

The present invention relates to a vehicle-mounted device and an information distribution system.

BACKGROUND ART

In recent years, vehicle-mounted devices have been developed which can utilize DSRC (Dedicated Short Range Communication) to perform dedicated short range communication with a roadside apparatus installed on a road to receive information provided by a center apparatus, via the roadside apparatus.

As a system using such a vehicle-mounted device, an ETC (Electronic Toll Collection System) is known in which a transmission and reception antenna provided at a toll gate communicates wirelessly with a vehicle including a vehicle-mounted device with an automatic toll collection function, in order to automatically collect the toll without the need to temporarily stop the vehicle. In the ETC technique, a problem of leakage of electric waves in the communication area of the transmission and reception antenna has arisen.

Thus, as a technique for preventing the leakage of electric waves in the ETC, for example, an electric wave absorber has been disclosed which includes an electric wave absorber member and an electric wave absorption assist member in order to suppress the leakage of electric waves in the communication area of the transmission and reception antenna (see Patent Document 1).

Patent Document 1: Japanese Patent Application Laid-Open No. 2002-237719

DISCLOSURE OF THE INVENTION

Problems to be Solved by the Invention

The leakage prevention technique for the ETC as described above involves a preset vehicle traveling direction and is thus effective for a type of road configured to allow a portion of the road intended for communication to be clearly specified. However, the prevention of leakage of electric waves is difficult for roads for which the traveling direction is not particularly specified and roads with no space in which the electric wave absorber can be installed.

In particular, a vehicle-mounted device with no GPS (Global Positioning System) or geographical information fails to determine the position and traveling direction of the vehicle with the vehicle-mounted device mounted therein. Thus, for example, if an electric wave leaks from a roadside apparatus installed in the opposite lane or an electric wave leaks from a roadside apparatus set on an expressway to a general road located immediately below the expressway, the vehicle-mounted device receives and outputs the leaking electric wave. Thus, unwanted information may be provided to users.

An object of the present invention is to prevent a vehicle-mounted device configured to provide in audio information received from a roadside apparatus by wireless communication from providing unwanted information as a result of the leakage of electric waves from a direction different from the traveling direction, and to allow the vehicle-mounted device to provide information corresponding to the traveling direction of the vehicle with the vehicle-mounted device.

Means for Solving the Problems

A first aspect of the present invention provides an information distribution system including a plurality of roadside apparatuses installed on a road, a center apparatus configured to allow first distribution information and/or second distribution information to be wirelessly transmitted to within a preset range via the roadside apparatus, the first distribution information including a division number preset to identify a road with the roadside apparatuses installed thereon and/or the second distribution information including content information and execution condition information allowing the content information to be executed based on the first distribution information, and a vehicle-mounted device including communication means for receiving the first distribution information and the second distribution information transmitted by the roadside apparatus, storage means for storing the first distribution information and the second distribution information received by the communication means, execution means for executing an operation corresponding to the content information, and control means for deciding whether or not to execute the operation corresponding to the content information included in the second distribution information based on the execution condition information included in the second distribution information received by the communication means, to allow the execution means to execute the content information in accordance with a result of the decision.

Moreover, in the information distribution system according to the present invention, the second distribution information includes the division number, and the execution condition information allows the execution means to execute the operation corresponding to the content information included in the second distribution information if the division number included in the second distribution information coincides with the division number included in the first distribution information stored in the storage means before the second distribution information is stored.

Moreover, in the information distribution system according to the present invention, the first distribution information includes a valid term for the division number included in the first distribution information, the second distribution information includes the division number, the execution condition information allows the execution means to execute the content information included in the second distribution information if the division number included in the second distribution information coincides with the division number included in the first distribution information stored in the storage means before the second distribution information is stored and if the valid term included in the first distribution information has not lapsed since the storage of the first distribution information in the storage means, and the control means starts counting the valid term included in the first distribution information when the first distribution information is stored in the storage means.

Moreover, the information distribution system according to the present invention is characterized in that a vehicle-mounted device includes communication means for receiving first distribution information and second distribution information transmitted by a plurality of roadside apparatuses installed on a road, the first distribution information including a division number preset to identify a road with the roadside apparatuses installed thereon, and the second distribution information including content information and execution condition information allowing the content information to be executed based on the first distribution information, storage means for storing the first distribution information and the second distribution information received by the communication means, execution means for executing an operation corresponding to the content information, and control means for deciding whether or not to execute the operation corresponding to the content information included in the second distribution information based on the execution condition information included in the second distribution information received by the communication means, to allow the execution means to execute the content information in accordance with a result of the decision.

Moreover, the information distribution system according to the present invention is characterized in that a vehicle-mounted device includes communication means for receiving first distribution information and second distribution information transmitted by a plurality of roadside apparatuses installed on a road, the first distribution information including a division number preset to identify a road with the roadside apparatuses installed thereon, and the second distribution information including content information and execution condition information allowing the content information to be executed based on the first distribution information, storage means for storing the first distribution information and the second distribution information received by the communication means, execution means for executing an operation of providing in audio the content information, and control means for deciding whether or not to execute the operation corresponding to the content information included in the second distribution information based on the execution condition information included in the second distribution information received by the communication means, to allow the execution means to execute the content information in accordance with a result of the decision.

Effect of the Invention

The present invention can prevent a vehicle-mounted device configured to provide in audio information received from a roadside apparatus by wireless communication from providing unwanted information resulting from the leakage of electric waves from a direction different from the traveling direction, and to allow the vehicle-mounted device to provide information corresponding to the traveling direction of the vehicle with the vehicle-mounted device.

BRIEF DESCRIPTION OF THE DRAWINGS

FIG. 1 is a diagram showing the system configuration of an information distribution system including a vehicle-mounted device according to an embodiment of the present invention;

FIG. 2(a) is a diagram showing an example of first distribution information, and FIG. 2(b) is a diagram showing second distribution information;

FIG. 3 is a diagram showing an example of content information;

DESCRIPTION OF REFERENCES

Figure 4:
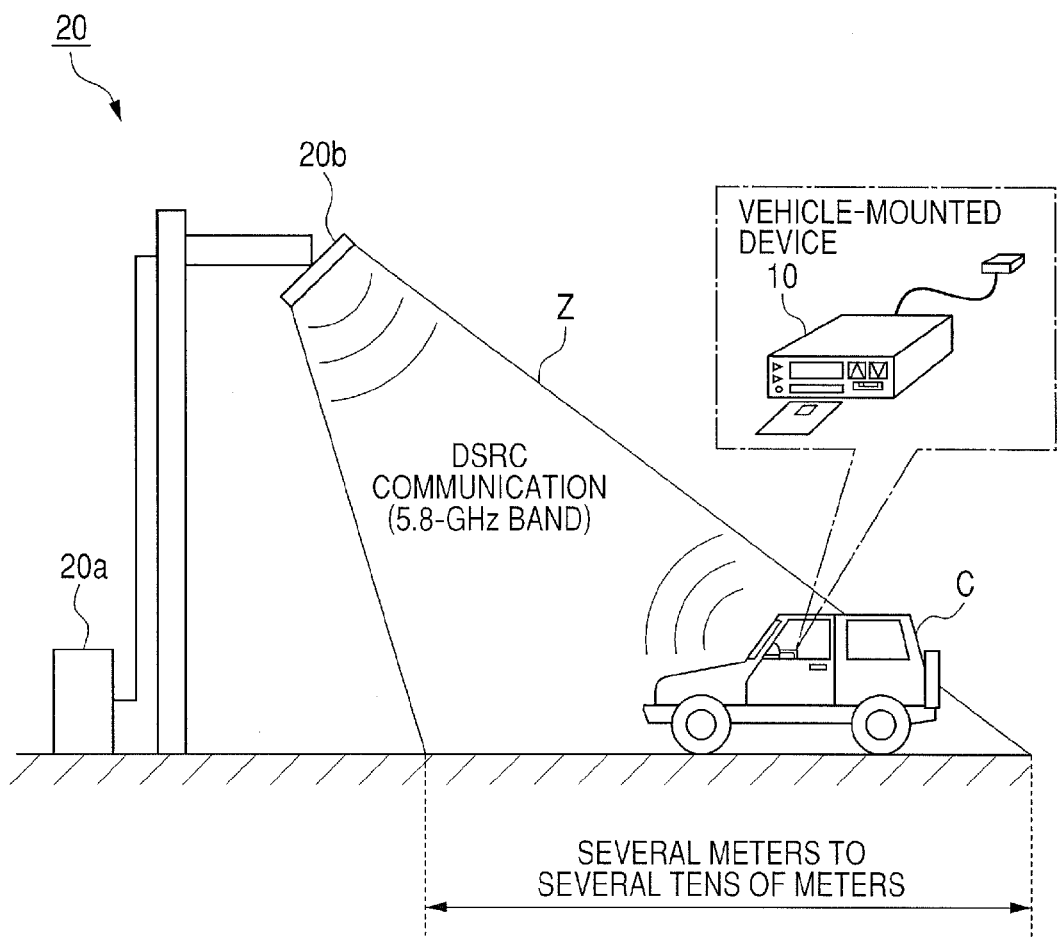
FIG. 4 is a diagram illustrating the roadside area of a roadside apparatus in FIG. 1.

1 Control unit
2 Storage unit
3 ROM
4 RAM
5 Operation display unit
6 DSRC unit
6a DSRC control unit
6b Communication unit
6c Storage unit
7 Reproduction unit
7a loudspeaker
8 I/O unit
10 Vehicle-mounted device
20 Roadside apparatus
20a Main body apparatus
20b Antenna
30 Center apparatus
100 Information distribution system
C Vehicle
N Network
Z Roadside area

BEST MODES FOR CARRYING OUT THE INVENTION

An embodiment of the present invention will be described below in detail with reference to the drawings. An utterance type vehicle-mounted device will be described in the embodiment, but the scope of the invention is not limited to illustrated examples. The present invention is also applied to an ITS (Intelligent Transport System) vehicle-mounted device configured to communicate with a center apparatus via a roadside apparatus and connected to an instrument with a navigation function to provide not only audio information but also image information, text information, and the like.

First, the configuration will be described.

FIG. 1 shows the system configuration of an information distribution system 100 including the vehicle-mounted device according to the present embodiment.

As shown in FIG. 1, the information distribution system 100 includes a vehicle-mounted device 10 mounted in a vehicle C, a plurality of roadside apparatuses 20, and a center apparatus 30. The center apparatus 30 distributes data including first distribution information and/or second distribution information to the vehicle-mounted device 10 via the roadside apparatus 20.

FIG. 2(a) shows an example of the first distribution information.

As shown in FIG. 2(a), the first distribution information includes a division number preset to identify a road on which each roadside apparatus 20 is installed, a valid term for the division number, and division number setting indication information allowing the division number and the valid term to be stored in the vehicle-mounted device.

FIG. 2(b) shows an example of second distribution information.

As shown in FIG. 2(b), the second distribution information includes content information, a division number, and execution condition information.

The content information includes reading-out information (TTS information) and audio information.

The execution condition information is indicative of the condition under which the content information is executed based on the division number included in the first distribution information and the division number included in the second distribution information.

The execution condition information in the present embodiment is indicative of the condition that the content information is executed in accordance with the precedence of the content information, or the following condition. An operation corresponding to the content information included in the second distribution information is executed if the division number included in the second distribution information coincides with the division number included in the first distribution information and stored in a storage unit of the vehicle-mounted device 10 before the second distribution information is stored and if the valid term included in the first distribution information has not lapsed since the storage of the first distribution information in the storage unit of the vehicle-mounted device 10.

Each component apparatus will be described below in detail.

The center apparatus 30 is configured to store data including the first distribution information and the second distribution information and to distribute the data to the vehicle-mounted device 10 via the roadside apparatus 20. For example, a computer terminal including a control unit, a communication unit, and a storage unit is applicable as the center apparatus 30; the control unit is configured to control distribution, the communication unit is configured to communicate with the roadside apparatus 20, and the storage unit is configured to store the data including the first distribution information and the second distribution information.

FIG. 1 shows only one center apparatus 30. However, a plurality of distributors distribute the data including the first distribution information and/or the second distribution information. The center apparatus 30 may be provided in each of the distributors.

Here, the content information included in the second distribution information distributed by the center apparatus 30 is described.

FIG. 3 shows an example of the data including the content information.

As shown in FIG. 3, the data includes utterance information D1 serving as content information and including speech reading-out information, and present position information such as a road type (for example, an expressway, a general road, a main local road, . . . ) and an orientation code (an inbound lane, an outbound lane, no information, . . . ).

Identification information is added to the content information depending on the content. The identification information is indicative of the classified types of the information based on the content. An example of the classified types includes, for example, emergency disaster information, safe driving support information, long sentence reading-out information, local multipurpose information, and electronic sign information. When the content information is classified in accordance with the content, preset identification information is added to the content information according to the classification.

Furthermore, the content information includes long sentence reading-out information with TTS (Text to Speech) and may include display text information. The TTS is information for speech synthesis. To allow reading-out information to be reproduced, audio information needs to be generated from the display text information based on the TTS.

Furthermore, the content information includes information indicative of an event associated with a vehicle traffic. The event refers to a thing which happens or a matter. Information indicative of the event may be, for example, traffic regulation information, disaster regulation information, traffic jam information, weather information, parking lot information, SA (Service Area)/PA (Parking Area) information, facility information, routing assistance information, construction site information, road condition information, or earthquake information.

Additionally, the content information is classified into highest-priority information, priority information, and selectable information in accordance with the precedence of execution. Analysis of this information allows the precedence of the content information to be decided. The precedence increases in the order of the highest-priority information, the priority information, and the selectable information. The highest-priority information is content information reproduced immediately after reception. The highest-priority information may be, for example, emergency disaster information such as a notification of an earthquake. The priority information is surely reproduced after reception but timing for the reproduction is not particularly specified. The priority information may be, for example, alert information on an accident. The user can selectively decide whether or not to reproduce the selectable information, and timing for the reproduction is not particularly specified. The selectable information may be, for example, a highway radio.

A plurality of roadside apparatuses 20 are installed on a road such as an expressway and a general road or on a road in a parking lot or the like. Each of the roadside apparatuses 20 is connected to the center apparatus 30 via a network N. Furthermore, the roadside apparatus 20 can communicate wirelessly with the vehicle-mounted device 10 in the vehicle C traveling on the road.

As shown in FIG. 4, the roadside apparatus 20 includes a main body apparatus 20a and an antenna 20b. The roadside apparatus 20 radiates a DSRC electric wave with a limited range through the antenna 20b installed alongside or above the road, to form a roadside area Z near the roadside apparatus 20. The roadside apparatus 20 can perform two-way dedicated short range communication only with the vehicle-mounted devices 10 in the vehicles C present in the roadside area Z. The dedicated short range communication between the roadside apparatus 20 and the vehicle-mounted device 10 is hereinafter sometimes referred to as road-to-vehicle communication.

The DSRC is a communication scheme that uses electric waves in a 5.8G Hz band. The communication range of the DSRC is, for example, between several meters and several tens of meters. DSRC transmission outputs from the roadside apparatuses 20 are all set to the same level. Thus, the roadside areas Z formed by the plurality of roadside apparatuses 20 are almost the same regardless of the installation site.

The main body apparatus 20a executes processing required to mediate the transmission of information between the vehicle-mounted device 10 and the center apparatus 30. That is, the main body apparatus 20a transfers data received from the vehicle-mounted device 10 to the center apparatus 30 via the antenna 20b. The main body apparatus 20a also transfers data transmitted by the center apparatus 30 to the vehicle-mounted device 10. A computer terminal including a control unit configured to execute information processing and communication control, a storage unit, and the like is applicable as the main body apparatus 20a.

Figure 5:
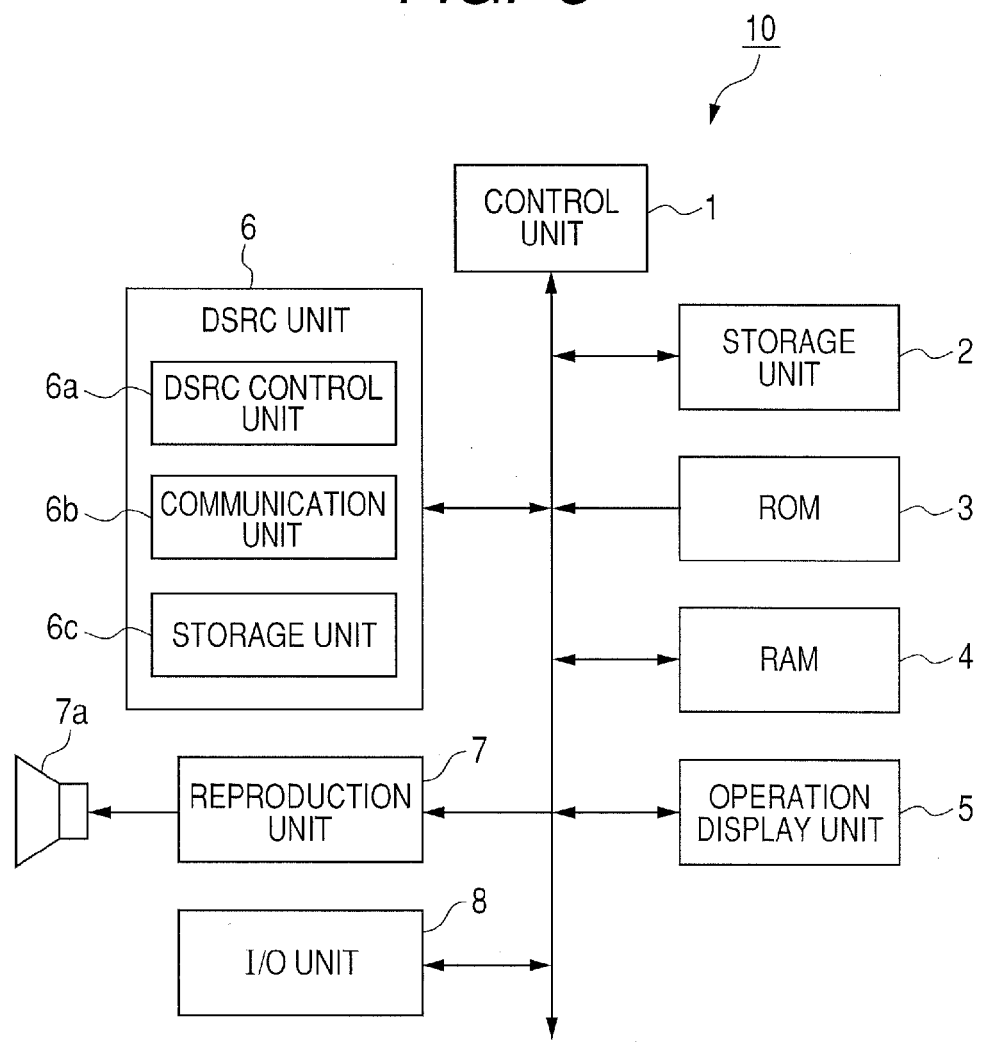
FIG. 5 is a diagram showing the configuration of the vehicle-mounted device.

FIG. 5 shows the configuration of the vehicle-mounted device 10.

As shown in FIG. 5, the vehicle-mounted device 10 includes a control unit 1, a storage unit 2, a ROM (Read Only Memory) 3, a RAM (Random Access Memory) 4, an operation display unit 5, a DSRC unit 6, a reproduction unit 7, and an I/O unit 8.

The control unit 1 includes a CPU (Central Processing Unit). The control unit expands control programs and required parameters and data stored in the ROM 3, into the RAM 4 to execute various calculations and centrally control the above-described units. For example, to perform road-to-vehicle communication with the roadside apparatus 20, the control unit 1 controls the communication operation of the DSRC unit 6. The control unit 1 cooperates with a DSRC control unit of the DSRC unit 6 in controlling the DSRC unit 6. Furthermore, for example, the control unit 1 saves data received from the center apparatus 30 via the DSRC unit 6 and controls the corresponding execution.

The control unit 1 according to the present embodiment expands programs and required data stored in the storage unit 2 into the RAM 4. When the first distribution information is stored in the storage unit 2, the control unit 1 counts the valid term included in the first distribution information. Based on the execution condition information included in the second distribution information received by the DSRC unit 6, the control unit 1 then decides whether or not the execution of an operation corresponding to the content information included in the second distribution information is acceptable. The control unit 1 further controls a data execution process of allowing the reproduction unit 7 to execute the content information in accordance with the result of the decision.

The storage unit 2 includes a nonvolatile memory and is configured to store programs required to execute the data execution process, and parameters and data required to execute the programs, as well as the data including the first distribution information and/or the second distribution information received from the center apparatus 30 via the roadside apparatus 20 and thus to store the division number included in the data.

The ROM 3 is configured to store control programs executed by the control unit 1, and parameters, data, and the like required to execute the control programs. The ROM 3 may be a read-only storage device and may include a magnetic or optical storage medium or a semiconductor memory.

The RAM 4 serves as a temporary storage area in which various programs, input or output data, and parameters read from the storage unit 2 and the ROM 3 are stored during various processes controllably executed by the control unit 1.

The operation display unit 5 includes a display such as a LED (Light Emitting Diode) and an operation key group. The operation display unit 5 displays various pieces of information on the display and outputs operation signals input via the operation key group, to the control unit 1.

The DSRC unit 6 functions as communication means by executing, for example, a communication process for receiving data from the center apparatus 30.

As shown in FIG. 5, the DSRC unit 6 includes a DSRC control unit 6a, a communication unit 6b, and a storage unit 6c.

The DSRC control unit 6a includes a CPU and a RAM. The DSRC control unit 6a expands control programs and required data stored in the storage unit 6c into the RAM to control the operations of the above-described units of the DSRC unit 6. For example, when the communication unit 6b receives data via the roadside apparatus 20, the DSRC control unit 6a outputs the data to the control unit 1.

The communication unit 6b includes an antenna fixedly installed on a dashboard in the vehicle C near a windshield.

The communication unit 6b transmits and receives DSRC electric waves to and from the roadside apparatus 20 and the like via the antenna.

The storage unit 6c is configured to store control programs executed by the DSRC control unit 6a, required data, and the like.

The reproduction unit 7 includes a speaker 7a and functions as execution means for executing operations (for example, audio reproduction) corresponding to the content information included in the second distribution information.

To reproduce reading-out information, the reproduction unit 7 executes a reading-out reproduction process (TTS (Text to Speech) process) of reproducing reading-out information by converting the reading-out information into audio information because the reading-out information is described in an intermediate language. In the reading-out reproduction process, the reproduction unit 7 analyzes the reading-out information to generate parameters required for speech synthesis (phoneme, the duration of vocal sound, a pitch, a temporal varying pattern of amplitude, and the like). The reproduction unit 7 uses the generated parameters to synthesize the speech waveform. The reproduction unit 7 outputs a signal for the synthesized speech to carry out audio reproduction.

The I/O unit 8 is an interface configured to communicate with external apparatuses. Communication with external apparatuses is controlled in accordance with instructions from the control unit 1. For example, data such as content information and various programs can be received from and output to an external apparatus to which the vehicle-mounted device 10 is connected via the I/O unit 8.

Now, operations will be described.

Figure 6:
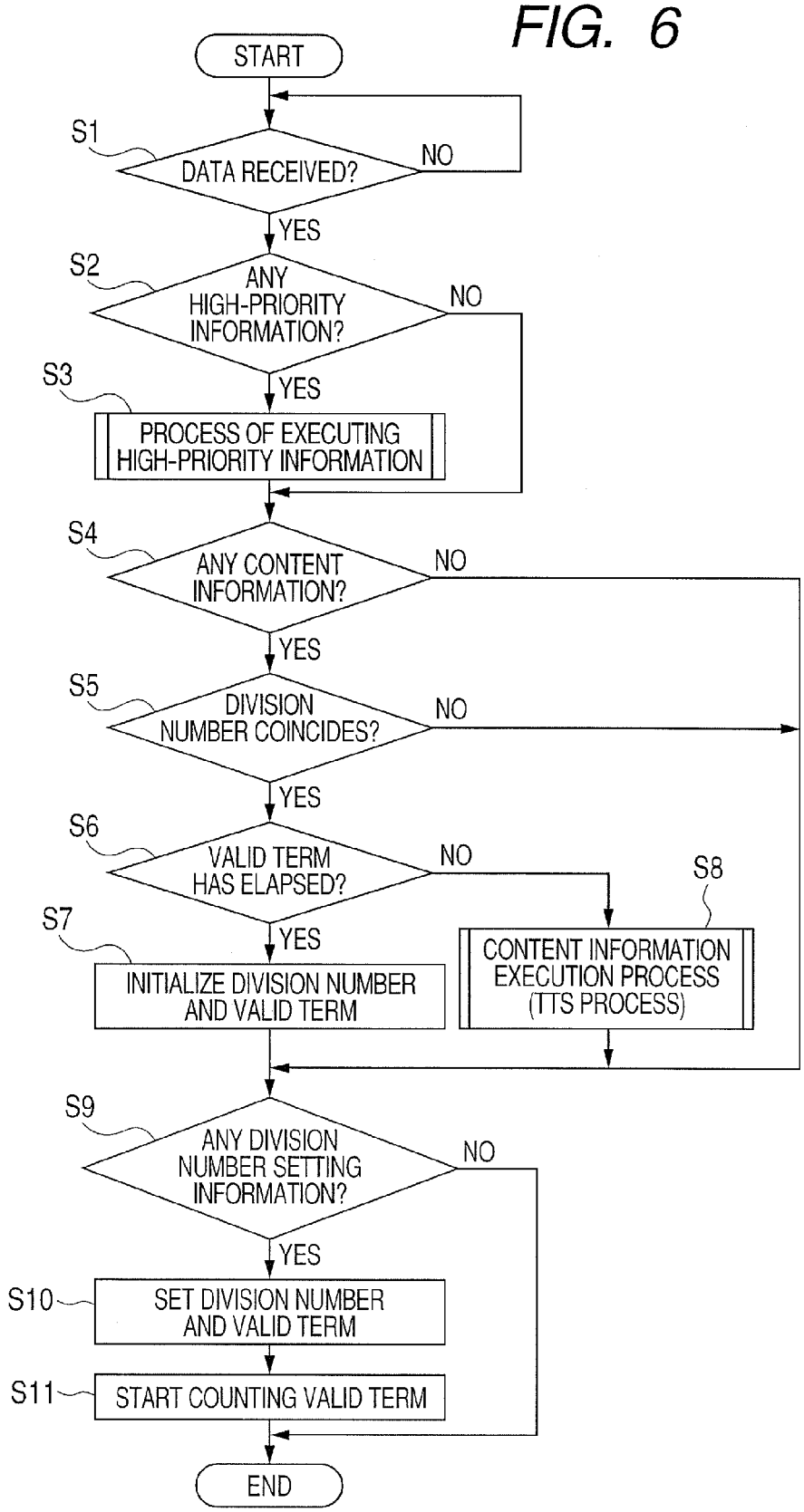
FIG. 6 is a flowchart illustrating a data execution process executed by a control unit of the vehicle-mounted device.

FIG. 6 is a flowchart illustrating a data execution process executed by the control unit 1 of the vehicle-mounted device 10. The data execution process is executed while power is being supplied to the vehicle-mounted device 10.

The control unit 1 decides whether or not the DSRC unit 6 has received data including the first distribution information and/or the second distribution information (step S1). If the DSRC unit 6 has not received the data (step S1; No), the control unit 1 returns to step S1. Alternatively, in the case of step S1; No, the following operation is possible. The control unit 1 decides whether or not the valid term being counted has lapsed. If the valid term has lapsed, the control unit initializes, that is, unsets the division number and valid term stored in the storage unit 2, and then returns to step S1.

If the DSRC unit 6 has received the data (step S1; Yes), the control unit 1 decides whether or not the received data includes high-priority information to be immediately executed (step S2). For example, if identification information on the content information included in the received data is indicative of emergency disaster information with a high degree of urgency or the precedence of the content information is indicative of highest-priority information, the control unit 1 decides that the received data includes high-priority information.

If the received data includes high-priority information (step S2; Yes), the control unit 1 allows the reproduction unit 7 to execute the high-priority information (step S3). If the received data includes no high-priority information (step S2; No) or after step S3, the control unit 1 decides whether or not the received data includes content information other than high-priority information, that is, whether or not the received data includes second distribution information with content information, a division number, and execution condition information (step S4).

If the received data includes content information other than high-priority information, that is, if the received data includes second distribution information (step S4; Yes), the control unit 1 decides, based on the execution condition information included in the received data, whether or not the division number included in the received data coincides with the division number stored in the storage unit 2 before the data has been received (step S5).

If the division number included in the received data coincides with the division number stored in the storage unit 2 before the data has been received (step S5; Yes), the control unit 1 decides whether or not the valid term included in the received data together with the division number has lapsed since the storage of the division number in the storage unit 2 preceding the reception of the data (step S6).

If the valid term has lapsed (step S6; Yes), the control unit 1 initializes, that is, unsets the division number and valid term stored in the storage unit 2 (step S7). If the valid term has not lapsed (step S6; No), the control unit 1 allows the reproduction unit 7 to execute a process (for example, a TTS process) of executing the content information other than high-priority information included in the data received from the reproduction unit 7 (step S8).

If the received data includes no content information other than high-priority information (step S4; No), if the division number included in the received data fails to coincide with the division number stored in the storage unit 2 before the data has been received (step S5, No), and after step S7 or step S8, the control unit 1 decides whether or not the received data includes a division number setting indication (step S9).

If the received data includes a division number setting indication, that is, if the received data includes the first distribution information (step S9; Yes), the control unit 1 stores and sets the division number and valid term included in the received data, in the storage unit 2 (step S10). The control unit 1 then starts counting the valid term (step S11). If the received data includes no division number setting indication, that is, if the received data does not include the first distribution information (step S9; No) or after step S11, the control unit 1 terminates the present processing.

Explanations will be given of an example of the installation position of the roadside apparatus 20 and an example of the operation of the data execution process executed by the vehicle-mounted device 10 in each example.

Figure 7:
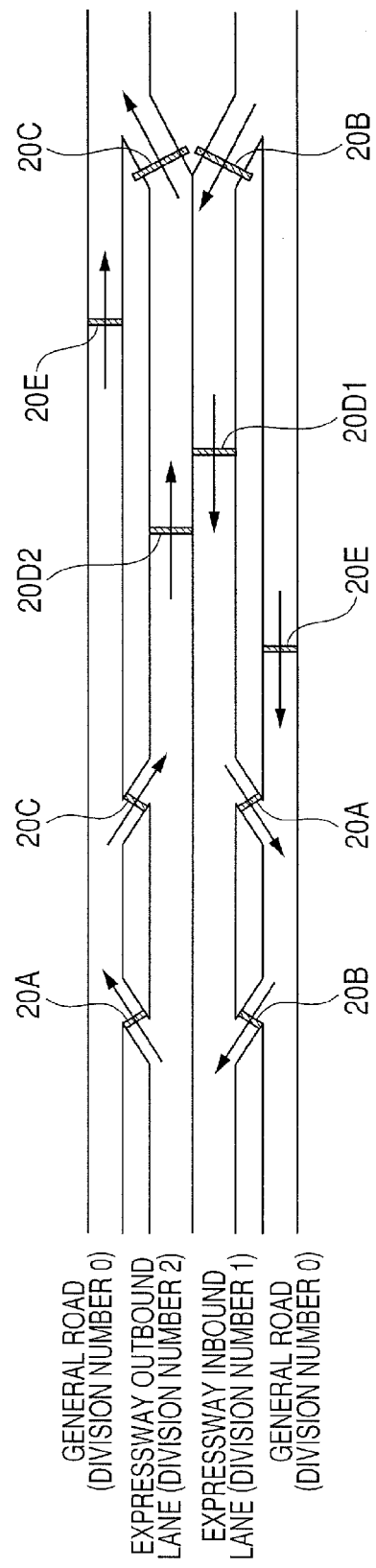
FIG. 7 is a diagram showing an example of positions where the roadside apparatuses are installed when an expressway is constructed above a general road.

FIG. 7 shows an example of positions where the roadside apparatuses 20 are installed when an expressway is constructed above a general road. In the example shown in FIG. 7, the division number for the general road is set to 0, which is indicative of an unset state. The division number for the inbound lane of the expressway is set to 1. The division number for the outbound lane of the expressway is set to 2.

As shown in FIG. 7, roadside apparatuses 20A, 20B, and 20C are installed at entries to and exits from the expressway. Roadside apparatuses 20D1, 20D2, and 20E are installed on the roads.

The roadside apparatus 20A is installed at an exit from the expressway to transmit data including first distribution information with a division number of 0. The roadside apparatus 20B is installed at an entry to the inbound lane of the expressway to transmit data including first distribution information with a division number of 1. The roadside apparatus 20C is installed at an entry to the outbound lane of the expressway to transmit data including first distribution information with a division number of 2.

The valid term included in the first distribution information is set to infinity.

The roadside apparatus 20D1 is installed on the inbound lane of the expressway to transmit data including second distribution information with content information, a division number set to 1, and execution condition information. The roadside apparatus 20D2 is installed on the outbound lane of the expressway to transmit data including second distribution information with content information, a division number set to 2, and execution condition information. The roadside apparatus 20E is installed on the general road to transmit data including second distribution information with content information, a division number set to 0, and execution condition information.

First, it is assumed that the division number in the storage unit 2 of the vehicle-mounted device 10 is set to 0, which is indicative of the unset state. When the vehicle C with the vehicle-mounted device 10 mounted therein passes from the general road through the entry to the inbound lane of the expressway, the data received by the vehicle-mounted device 10 via the roadside apparatus 20B is only the first distribution information. Thus, the division number set and stored in the storage unit 2 of the vehicle-mounted device 10 is changed from 0 to 1. The valid term is set to infinity and stored in the storage unit 2. Then, the valid term starts to be counted. However, since the valid term is set to infinity, the valid term is prevented from lapsing until the valid term is changed.

When the vehicle including the vehicle-mounted device 10 mounted therein and traveling in the inbound lane of the expressway receives data from the roadside apparatus 20D1, if the data includes high-priority information, the vehicle-mounted device 10 executes the high-priority information. Thereafter, since the division number of 1 in the second distribution information included in the data coincides with the division number of 1 stored in the storage unit 2 and the valid term has not lapsed, the content information included in the second distribution information is executed by the reproduction unit 7. The data received from the roadside apparatus 20D1 does not include first distribution information including a division number setting indication. Thus, the division number and valid term set in the storage unit 2 are not changed.

Even if the vehicle-mounted device 10 receives data from the roadside apparatus 20D2, since the division number of 2 in the second distribution information included in the data does not coincide with the division number of 1 stored in the storage unit 2, the content information is not executed by the reproduction unit 7. Furthermore, the division number and valid term set in the storage unit 2 are not changed.

Thereafter, when the vehicle with the vehicle-mounted device 10 mounted therein passes through an exit from the expressway, the data that the vehicle-mounted device 10 receives from the roadside apparatus 20A is only the first distribution information with a division number setting indication. Thus, the division number set and stored in the storage unit 2 of the vehicle-mounted device 10 is changed from 1 to 0. The valid term is set to infinity and stored in the storage unit 2. The valid term starts to be counted. If the first distribution information includes valid term information, the setting of the valid term is also changed.

Furthermore, when the vehicle C with the vehicle-mounted device 10 mounted therein passes through an entry to the outbound lane of the expressway, the data that the vehicle-mounted device receives from the roadside apparatus 20C is only the first distribution information. Thus, the division number set and stored in the storage unit 2 of the vehicle-mounted device 10 is changed from 0 to 2. The valid term is set to infinity and stored in the storage unit 2. The valid term starts to be counted.

When the vehicle including the vehicle-mounted device 10 mounted therein and traveling in the outbound lane of the expressway receives data from the roadside apparatus 20D2, if the data includes high-priority information, the vehicle-mounted device 10 executes the high-priority information.

Thereafter, since the division number of 2 in the second distribution information included in the data coincides with the division number of 2 stored in the storage unit 2 and the valid term has not lapsed, the content information included in the second distribution information is executed by the reproduction unit 7. The data received from the roadside apparatus 20D1 does not include first distribution information including a division number setting indication. Thus, the division number and valid term set in the storage unit 2 are not changed.

Even if the vehicle-mounted device 10 receives data from the roadside apparatus 20D1, since the division number of 1 in the second distribution information included in the data does not coincide with the division number of 2 stored in the storage unit 2, the content information is not executed by the reproduction unit 7. Furthermore, the division number and valid term set in the storage unit 2 are not changed.

Thereafter, when the vehicle with the vehicle-mounted device 10 mounted therein passes through an exit from the expressway, the data that the vehicle-mounted device 10 receives from the roadside apparatus 20A is only the first distribution information. Thus, the division number set and stored in the storage unit 2 of the vehicle-mounted device 10 is changed from 2 to 0. The valid term is set to infinity and stored in the storage unit 2. The valid term starts to be counted.

Furthermore, a division number of 0 is set in the storage unit 2 of the vehicle-mounted device 10 mounted in the vehicle traveling on the general road. Thus, when the vehicle including the vehicle-mounted device 10 mounted therein and traveling on the general road receives data from the roadside apparatus 20E, if the data includes high-priority information, the vehicle-mounted device 10 executes the high-priority information. Thereafter, since the division number of 0 in the second distribution information included in the data coincides with the division number of 0 stored in the storage unit 2 and the valid term has not lapsed, the content information included in the second distribution information is executed by the reproduction unit 7. The data received from the roadside apparatus 20E does not include first distribution information including a division number setting indication. Thus, the division number and valid term set in the storage unit 2 are not changed.

Thus, the content information for the inbound lane can be prevented from being executed by the vehicle-mounted device 10 mounted in the vehicle traveling in the outbound lane. Furthermore, the content information for the outbound lane can be prevented from being executed by the vehicle-mounted device 10 mounted in the vehicle traveling in the inbound lane. Hence, even if data transmitted by the roadside apparatus installed in the opposite lane leaks, the content information for the opposite lane can be prevented from being executed.

Furthermore, even if data transmitted by the roadside apparatus installed in the expressway leaks to the general road, the content information for the expressway can be prevented from being executed by the vehicle-mounted device 10 mounted in the vehicle traveling on the general road. Additionally, even if data transmitted by the roadside apparatus installed on the general road leaks to the expressway, the content information for the general road can be prevented from being executed by the vehicle-mounted device 10 mounted in the vehicle traveling on the expressway.

Figure 8:
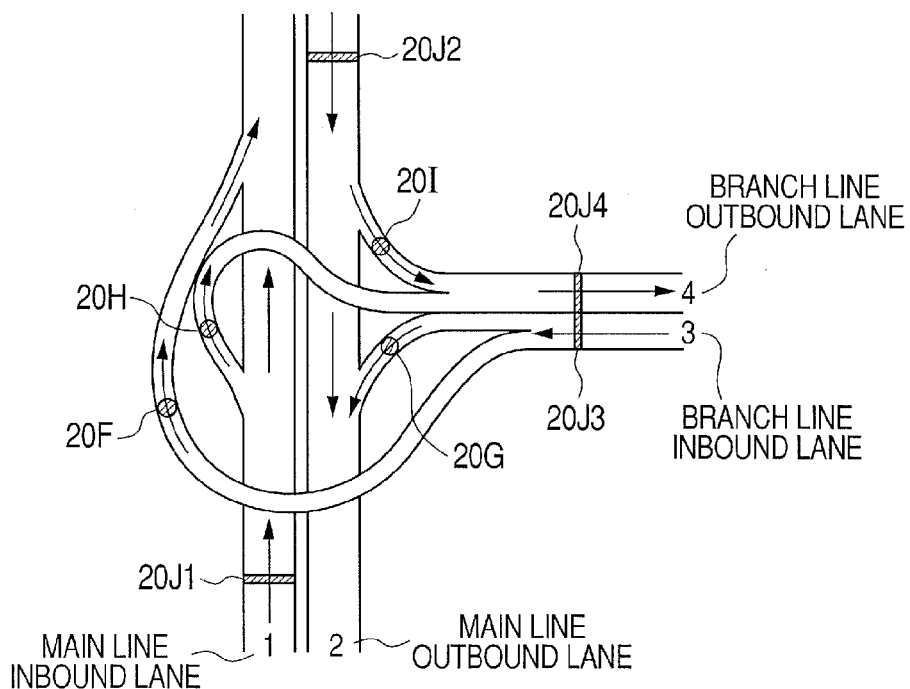
FIG. 8 is a diagram showing an example of the installation positions of the roadside apparatuses at a junction of an expressway.

FIG. 8 shows an example of the installation positions of the roadside apparatuses 20 at a junction on the expressway.

In the example shown in FIG. 8, the division number for the main line inbound lane of the expressway is set to 1. The division number for the main line outbound lane is set to 2. The division number for the branch line inbound lane is set to 3. The division number for the branch line outbound lane is set to 4.

As shown in FIG. 8, at the junction, roadside apparatuses 20F, 20G, 20H, and 20I are installed so as to prevent transmitted electric waves from leaking to a road other than the intended one. Furthermore, roadside apparatuses 20J1, 20J2, 20J3, and 20J4 are installed on the roads.

The roadside apparatus 20F is installed on a road of the expressway leading from the branch line inbound lane to the main line inbound lane, to transmit data including first distribution information with a division number of 1. The roadside apparatus 20G is installed on a road of the expressway leading from the branch line inbound lane to the main line outbound lane, to transmit data including first distribution information with a division number of 2. The roadside apparatus 20H is installed on a road of the expressway leading from the main line inbound lane to the branch line outbound lane, to transmit data including first distribution information with a division number of 4. The roadside apparatus 20I is installed on a road of the expressway leading from the main line outbound lane to the branch line outbound lane, to transmit data including first distribution information with a division number of 4.

The valid term included in the first distribution information is assumed to be set to infinity.

The roadside apparatus 20J1 is installed on the main line inbound road of the expressway to transmit data including second distribution information with content information, a division number set to 1, and execution condition information. The roadside apparatus 20J2 is installed on the main line outbound road of the expressway to transmit data including second distribution information with content information, a division number set to 2, and execution condition information. The roadside apparatus 20J3 is installed on the branch line inbound road of the expressway to transmit data including second distribution information with content information, a division number set to 3, and execution condition information. The roadside apparatus 20J4 is installed on the branch line outbound road of the expressway to transmit data including second distribution information with content information, a division number set to 4, and execution condition information.

For example, a division number of 1 is set in the storage unit 2 of the vehicle-mounted device 10 mounted in the vehicle traveling in the main line inbound lane of the expressway. Thus, when the vehicle-mounted device 10 receives data from the roadside apparatus 20J1, if the data includes high-priority information, the vehicle-mounted device 10 executes the high-priority information. Thereafter, the vehicle-mounted device 10 allows the reproduction unit 7 to execute the content information included in the second distribution information included in the data.

Then, when the vehicle-mounted device 10 mounted in the vehicle traveling in the main line inbound lane of the expressway travels on the road from the main line inbound lane to the branch line outbound lane, the roadside apparatus 20H changes the division number set and stored in the storage unit 2 of the vehicle-mounted device 10 from 1 to 4. The valid term is set to infinity and stored in the storage unit, and starts to be counted.

Furthermore, a division number of 2 is set in the storage unit 2 of the vehicle-mounted device 10 mounted in the vehicle traveling in the main line outbound lane of the expressway. Thus, when the vehicle-mounted device 10 receives data from the roadside apparatus 20J2, if the data includes high-priority information, the vehicle-mounted device 10 executes the high-priority information. Thereafter, the vehicle-mounted device 10 allows the reproduction unit 7 to execute the content information included in the second distribution information included in the data.

Then, when the vehicle-mounted device 10 mounted in the vehicle traveling in the main line outbound lane of the expressway travels on the road from the main line outbound lane to the branch line outbound lane, the roadside apparatus 20I changes the division number set and stored in the storage unit 2 of the vehicle-mounted device 10 from 2 to 4. The valid term is set to infinity and stored in the storage unit, and starts to be counted.

A division number of 4 is set in the storage unit 2 of the vehicle-mounted device 10 mounted in the vehicle traveling in the branch line outbound lane of the expressway. Thus, after the above-described operation, when the vehicle-mounted device 10 receives data from the roadside apparatus 20J4, if the data includes high-priority information, the vehicle-mounted device 10 executes the high-priority information. Thereafter, the vehicle-mounted device allows the reproduction unit 7 to execute the content information included in the second distribution information included in the data.

On the other hand, a division number of 3 is set in the storage unit 2 of the vehicle-mounted device 10 mounted in the vehicle traveling in the branch line inbound lane of the expressway. Thus, when the vehicle-mounted device 10 receives data from the roadside apparatus 20J3, if the data includes high-priority information, the vehicle-mounted device 10 executes the high-priority information. Thereafter, the vehicle-mounted device 10 allows the reproduction unit 7 to execute the content information included in the second distribution information included in the data.

Then, when the vehicle-mounted device 10 mounted in the vehicle traveling in the branch line inbound lane of the expressway travels on the road from the branch line inbound lane to the main line inbound lane, the roadside apparatus 20F changes the division number set and stored in the storage unit 2 of the vehicle-mounted device 10 from 3 to 1. The valid term is set to infinity and stored in the storage unit, and starts to be counted.

Furthermore, when the vehicle-mounted device 10 mounted in the vehicle traveling in the branch line inbound lane of the expressway travels on the road from the branch line inbound lane to the main line outbound lane, the roadside apparatus 20G changes the division number set and stored in the storage unit 2 of the vehicle-mounted device 10 from 3 to 2. The valid term is set to infinity and stored in the storage unit, and starts to be counted.

Thus, the content information for the inbound lane can be prevented from being executed by the vehicle-mounted device 10 mounted in the vehicle traveling in the outbound lane. Furthermore, the content information for the outbound lane can be prevented from being executed by the vehicle-mounted device 10 mounted in the vehicle traveling in the inbound lane. Hence, even if data transmitted by the roadside apparatus installed in the opposite lane leaks, the content information for the opposite lane can be prevented from being executed.

Figure 9:
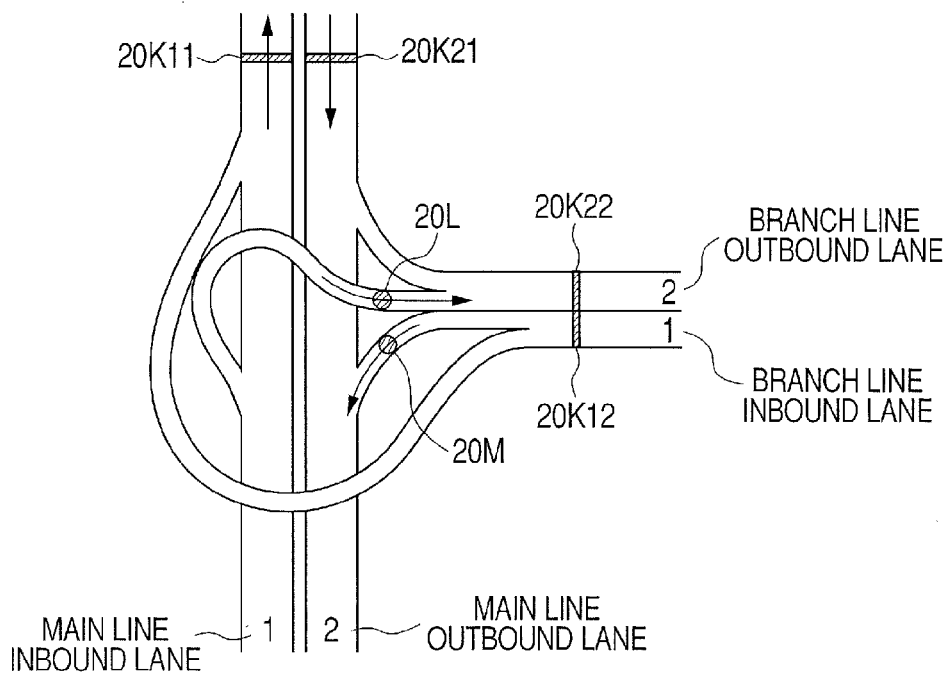
FIG. 9 is a diagram showing another example of the installation positions of the roadside apparatuses at a junction of the expressway.

FIG. 9 shows another example of the installation positions of the roadside apparatuses 20 at a junction on the expressway.

In the example shown in FIG. 9, the division number for the main line inbound lane of the expressway is set to 1. The division number for the main line outbound lane is set to 2. The division number for the branch line inbound lane is set to 1. The division number for the branch line outbound lane is set to 2.

In the example shown in FIG. 9, roadside apparatuses 20L and 20M are installed so as to prevent transmitted electric waves from leaking to a road other than the intended one.

A roadside apparatus 20K11 is installed on the main line inbound road of the expressway, and a roadside apparatus 20K12 is installed on the branch line inbound road of the expressway. The roadside apparatuses 20K11 and 20K12 transmit data including second distribution information with content information, a division number set to 1, and execution condition information. A roadside apparatus 20K21 is installed on the main line outbound road of the expressway, and a roadside apparatus 20K22 is installed on the branch line outbound road of the expressway. The roadside apparatuses 20K21 and 20K22 transmit data including second distribution information with content information, a division number set to 2, and execution condition information.

The roadside apparatus 20L is installed on a road of the expressway leading from the main line inbound lane to the branch line outbound lane, to transmit data including first distribution information with a division number of 2. The roadside apparatus 20M is installed on a road of the expressway leading from the branch line inbound lane to the main line outbound lane, to transmit data including first distribution information with a division number of 2. The valid term included in the first distribution information is assumed to be set to infinity.

For example, a division number of 1 is set in the storage unit 2 of the vehicle-mounted device 10 mounted in the vehicle traveling in the main line inbound lane of the expressway. Thus, when the vehicle-mounted device 10 receives data from the roadside apparatus 20K11, if the data includes high-priority information, the vehicle-mounted device 10 executes the high-priority information. Thereafter, the vehicle-mounted device 10 allows the reproduction unit 7 to execute the content information included in the second distribution information included in the data.

Furthermore, the roadside apparatus 20K11 is installed sufficiently away from the branch line of the expressway. Thus, no electric wave leaks from this roadside apparatus to the branch line. This prevents the vehicles traveling in the branch line inbound lane from receiving data from the roadside apparatus 20K11. Therefore, the roadside apparatus 20K11 can transmit information directed to the vehicles traveling in the main line inbound lane.

Similarly, the roadside apparatus 20K12 is installed sufficiently away from the main line of the expressway. Thus, no electric wave leaks from this roadside apparatus to the main line. This prevents the vehicles traveling in the main line inbound lane from receiving data from the roadside apparatus 20K12. Therefore, the roadside apparatus 20K12 can transmit information directed to the vehicles traveling in the branch line inbound lane.

When the vehicle-mounted device 10 mounted in the vehicle traveling in the main line inbound lane of the expressway travels on the road from the main line inbound lane to the branch line outbound lane, the roadside apparatus 20L changes the division number set and stored in the storage unit 2 of the vehicle-mounted device 10 from 1 to 2. The valid term is set to infinity and stored in the storage unit, and starts to be counted.

Furthermore, a division number of 2 is set in the storage unit 2 of the vehicle-mounted device 10 mounted in the vehicle traveling in the main line outbound lane of the expressway. Thus, when the vehicle-mounted device 10 receives data from the roadside apparatus 20K21, if the data includes high-priority information, the vehicle-mounted device 10 executes the high-priority information. Thereafter, the vehicle-mounted device 10 allows the reproduction unit 7 to execute the content information included in the second distribution information included in the data.

Moreover, the roadside apparatus 20K21 is installed sufficiently away from the branch line of the expressway. Thus, no electric wave leaks from this roadside apparatus to the branch line. This prevents the vehicles traveling in the branch line outbound lane from receiving data from the roadside apparatus 20K21. Therefore, the roadside apparatus 20K21 can transmit information directed to the vehicles traveling in the main line outbound lane.

Similarly, the roadside apparatus 20K22 is installed sufficiently away from the main line of the expressway. Thus, no electric wave leaks from this roadside apparatus to the main line. This prevents the vehicles traveling in the main line outbound lane from receiving data from the roadside apparatus 20K22. Therefore, the roadside apparatus 20K22 can transmit information directed to the vehicles traveling in the branch line outbound lane.

When the vehicle-mounted device 10 mounted in the vehicle traveling in the main line outbound lane of the expressway travels on the road from the main line outbound lane to the branch line outbound lane, the division number is not changed. Thus, the roadside apparatus need not set the division number or the valid term. Furthermore, when the vehicle-mounted device 10 mounted in the vehicle traveling in the branch line inbound lane of the expressway travels on the road from the branch line inbound lane to the main line inbound lane, the division number is not changed. Thus, the roadside apparatus need not set the division number or the valid term.

When the vehicle-mounted device 10 mounted in the vehicle traveling in the branch line inbound lane of the expressway travels on the road from the branch line inbound lane to the main line outbound lane, the roadside apparatus 20M changes the division number set and stored in the storage unit 2 of the vehicle-mounted device 10 from 1 to 2. The valid term is set to infinity and stored in the storage unit, and starts to be counted.

Thus, even if data transmitted by the roadside apparatus installed in the opposite lane leaks, the content information for the opposite lane can be prevented from being executed. Moreover, when roadside apparatuses configured to transmit data including the second distribution information are installed at respective points where possible data leakage between the main line and the branch line is prevented, the number of installed roadside apparatuses configured to transmit data including the first distribution information can be reduced. The number of division numbers can also be reduced.

That is, the roadside apparatus installed on the main line to transmit the second distribution information is prevented from leaking to the branch line located sufficiently away from the main line. Consequently, the same division number can be used for both the main line and the branch line without any problem. In the description of FIG. 9, the same division number is used for both the main line inbound lane and the branch line inbound lane, and the same division number is used for both the main line outbound lane and the branch line outbound lane. However, the same division number may be used for both the main line inbound lane and the branch line outbound lane, and the same division number may be used for both the main line outbound lane and the branch line inbound lane. Alternatively, the main line inbound and outbound lanes may be the inbound and outbound lanes of a belt line.

Figure 10:
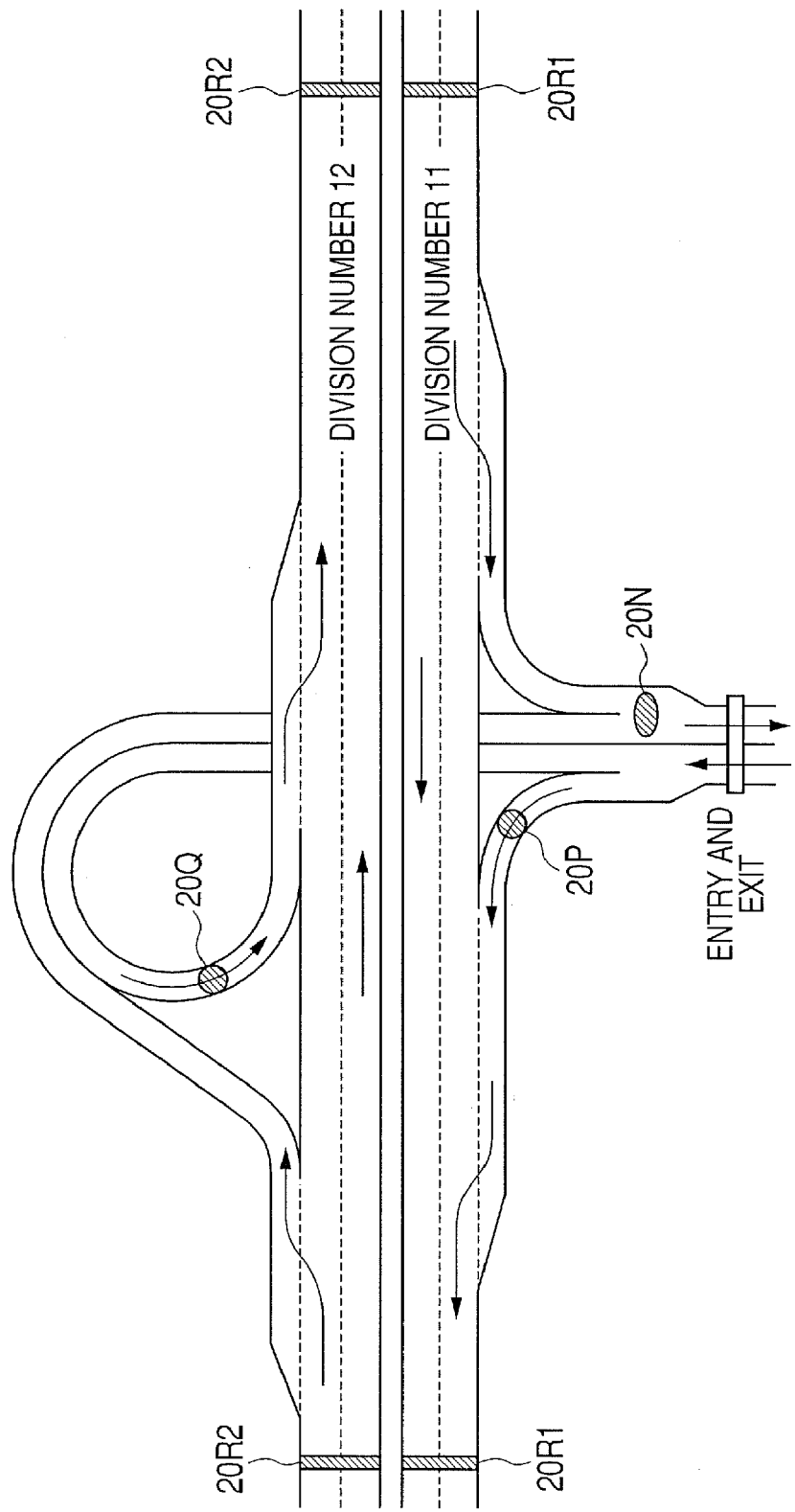
FIG. 10 is a diagram showing an example of the installation position of the roadside apparatus at an interchange of the expressway.

FIG. 10 shows an example of the installation positions of the roadside apparatuses 20 at an interchange of the expressway.

In the example shown in FIG. 10, the division number for a general road is set to 0, which is indicative of the unset state. The division number for the inbound lane of an expressway is set to 11. The division number for the outbound lane of the expressway is set to 12.

As shown in FIG. 10, at an interchange, roadside apparatuses 20N, 20P, and 20Q are installed at entries to and exits from the expressway. Roadside apparatuses 20R1 and 20R2 are installed on the roads.

The roadside apparatus 20N is installed at an exit from the expressway to transmit data including first distribution information with a division number of 0. The roadside apparatus 20P is installed on a road of the expressway leading from an entry to the expressway to the inbound lane thereof, to transmit data including first distribution information with a division number of 11. The roadside apparatus 20Q is installed on a road of the expressway leading from an entry to the expressway to the outbound lane thereof and completely separated from the road leading from the entry to the expressway to the inbound lane, to transmit data including first distribution information with a division number of 12.

The valid term included in the first distribution information is assumed to be set to infinity.

The roadside apparatus 20R1 is installed on the inbound lane of the expressway to transmit data including second distribution information with content information, a division number set to 11 and execution condition information. The roadside apparatus 20R2 is installed on the outbound lane of the expressway to transmit data including second distribution information with content information, a division number set to 12 and execution condition information.

First, it is assumed that a division number of 0 is set in the storage unit 2 of the vehicle-mounted device 10.

When the vehicle C with the vehicle-mounted device 10 mounted therein passes from the general road through the entry to the expressway and on the road from the entry to the inbound lane, the roadside apparatus 20P changes the division number set and stored in the storage unit 2 of the vehicle-mounted device 10 from 0 to 11. The valid term is set to infinity and stored in the storage unit, and starts to be counted.

When the vehicle including the vehicle-mounted device 10 mounted therein and traveling on the inbound lane of the expressway receives data from the roadside apparatus 20R1, if the data includes high-priority information, the vehicle-mounted device 10 executes the high-priority information. Thereafter, the vehicle-mounted device 10 allows the reproduction unit to execute the content information included in the second distribution information included in the data.

On the other hand, when the vehicle C with the vehicle-mounted device 10 mounted therein passes from the general road through the entry to the expressway and on the road from the entry to the outbound lane, the roadside apparatus 20Q changes the division number set and stored in the storage unit 2 of the vehicle-mounted device 10 from 0 to 12. The valid term is set to infinity and stored in the storage unit, and starts to be counted.

When the vehicle including the vehicle-mounted device 10 mounted therein and traveling on the outbound lane of the expressway receives data from the roadside apparatus 20R2, if the data includes high-priority information, the vehicle-mounted device 10 executes the high-priority information.

Thereafter, the vehicle-mounted device 10 allows the reproduction unit 7 to execute the content information included in the second distribution information included in the data.

Furthermore, when the vehicle with the vehicle-mounted device 10 mounted therein passes through the exit from the expressway, the vehicle-mounted device receives data from the roadside apparatus 20N. Then, the division number stored in the storage unit 2 of the vehicle-mounted device 10 is changed from 11 to 0 or from 12 to 0. The valid term is set to infinity and stored in the storage unit, and starts to be counted.

Thus, even if data transmitted by the roadside apparatus installed in the opposite lane leaks, the content information for the opposite lane can be prevented from being executed.

Figure 11:
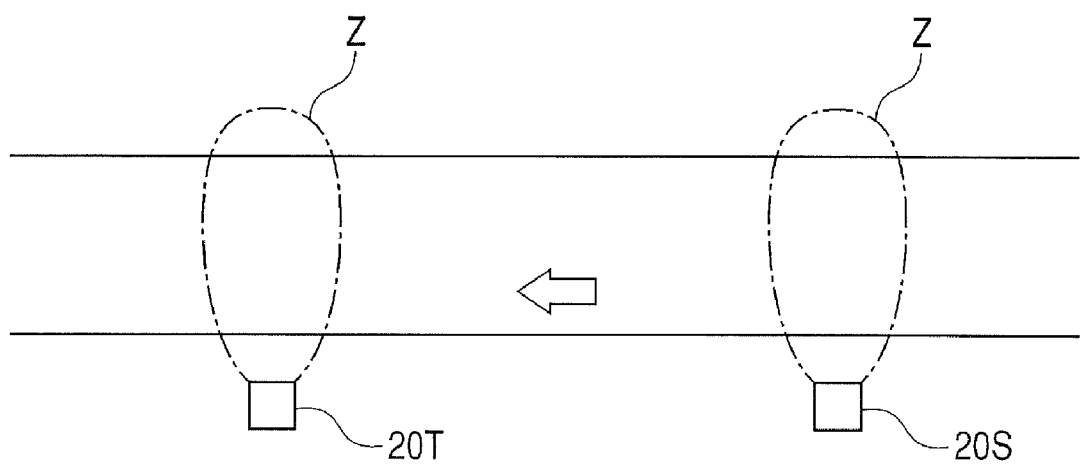
FIG. 11 is a diagram showing an example of the installation position of the roadside apparatus on a general road.

FIG. 11 shows an example of the installation positions of the roadside apparatuses 20 on a general road.

Unlike the expressway, a general road includes no entry or exit. For structural reasons, the road is not separated into a number of portions depending on the traveling direction. Therefore, the valid term is set depending on traffic conditions.

FIG. 11 shows an example of the installation positions of the roadside apparatuses 20 in which only the vehicle-mounted devices mounted in the vehicles traveling in the direction of the arrow (the direction from a roadside apparatus 20S toward a roadside apparatus 20T) are allowed to execute the content information.

As shown in FIG. 11, the roadside apparatuses 20S and 20T are installed at positions where the general road is located in the roadside area of each roadside apparatus.

The roadside apparatus 20S is installed upstream of the roadside apparatus 20T in the direction of the arrow to transmit data including first distribution information with a division number of 5 and a valid term of 3 minutes. The roadside apparatus 20T is installed downstream of the roadside apparatus 20S in the direction of the arrow to transmit data including second distribution information with content information, a division number set to 5, and execution condition information and first distribution information with a division number of 0 and a valid term of infinity. The state in which the division number is unset is defined as 0.

First, it is assumed that a division number of 0 is set in the storage unit 2 of the vehicle-mounted device 10. In the following description, the vehicle with the vehicle-mounted device 10 mounted therein travels in the direction of the arrow.

The vehicle C with the vehicle-mounted device 10 mounted therein passes through the roadside area Z of the roadside apparatus 20S and then receives data from the roadside apparatus 20S. Then, the division number set and stored in the storage unit 2 of the vehicle-mounted device 10 is changed from 0 to 5. The valid term is set to 3 minutes and stored in the storage unit 2. The valid term (3 minutes) then starts to be counted.

Thereafter, the vehicle having passed through the roadside area Z of the roadside apparatus 20S passes through the roadside area Z of the roadside apparatus 20T, and the vehicle-mounted device 10 mounted in the vehicle receives data from the roadside apparatus 20T. Then, if the data includes high-priority information, the vehicle-mounted device 10 executes the high-priority information. Thereafter, if the division number of 5 in the second distribution information included in the data coincides with the division number of 5 stored in the storage unit 2 and the valid term has not lapsed yet, the content information included in the second distribution information is executed by the reproduction unit 7. After the content information is executed, the division number and valid term in the first distribution information included in the data are set and stored in the storage unit 2 of the vehicle-mounted device 10. That is, the set division number is changed from 5 to 0, and the valid term is set to infinity and stored in the storage unit.

Now, the case in which the vehicle with the vehicle-mounted device 10 mounted therein travels in the direction opposite to that of the arrow will be described.

The vehicle not having passed through the roadside area Z of the roadside apparatus 20S passes through the roadside area Z of the roadside apparatus 20T, and the vehicle-mounted device 10 mounted in the vehicle receives data from the roadside apparatus 20T. Then, if the data includes high-priority information, the vehicle-mounted device 10 executes the high-priority information. Thereafter, the content information is not executed because the division number of 5 in the second distribution information included in the data does not coincide with the division number of 0 stored in the storage unit 2. The division number, and valid term in the first distribution information included in the data are set and stored in the storage unit of the vehicle-mounted device 10. That is, the set division number is changed from 0 to 0, and the valid term is set to infinity and stored in the storage unit.

Thereafter, the vehicle C with the vehicle-mounted device 10 mounted therein passes through the roadside area Z of the roadside apparatus 20S and then receives data from the roadside apparatus 20S. Then, the division number set and stored in the storage unit 2 of the vehicle-mounted device 10 is changed from 0 to 5. The valid term is set to 3 minutes and stored in the storage unit 2. The valid term (3 minutes) then starts to be counted.

However, the position where the roadside apparatus 20T is installed upstream of the roadside apparatus 20S in the direction of the arrow is such that the vehicle C cannot pass through the roadside apparatus 20T within the valid term. Thus, after the valid term lapses, the division number set and stored in the storage unit 2 is changed from 5 to 0. The valid term set and stored in the storage unit 2 is changed from 3 minutes to infinity.

Thus, even for a road with no distinctive traveling directions, content information for preset one direction can be prevented from being executed by the vehicle-mounted device 10 mounted in the vehicle traveling in the other direction. Therefore, content information for a direction different from the traveling direction can be prevented from being executed.

As described above, according to the present embodiment, the vehicle-mounted device configured to auditorially provide information received from the roadside apparatus by wireless communication can be prevented from providing erroneous information as a result of leakage of electric waves from a direction different from the traveling direction. Hence, the information corresponding to the traveling direction of the vehicle with the vehicle-mounted device mounted therein can be provided.

In particular, the operation corresponding to the content information can be executed only on the vehicles passing through the roadside area of the roadside apparatus configured to transmit the first distribution information and then traveling in the direction in which the vehicle passes within the valid term through the roadside area of the roadside apparatus configured to transmit the second distribution information. Thus, the content information can be prevented from being provided to the vehicles traveling along a different path or receiving the first distribution information transmitted by another roadside apparatus. The vehicles traveling in the expected direction can be exclusively provided with the required content information.

Furthermore, after whether or not to execute the operation corresponding to the content information included in the second distribution information is decided, a new division number can be stored in the storage means.

Of course, the present invention is not limited to the above-described embodiment. The embodiment can be appropriately varied.

For example, in the examples of the present embodiment, the roadside apparatus is installed in each of the inbound and outbound lanes. However, a roadside apparatus may be installed which is used for both the inbound and outbound lanes.

The following condition depending on the setting status of the division number may be adopted: the operation corresponding to the content information included in the second distribution information is executed if the division number included in the second distribution information fails to coincide with the division number included in the first distribution information stored in the storage device before the second distribution information is stored.

Furthermore, in connection with the information distribution system according to the above-described embodiment, the above-described embodiment is preferably applied to an utterance type vehicle-mounted device with no means for deciding the latitude and longitude or direction. However, the vehicle-mounted device is not limited to the utterance type.

The invention claimed is:

1. An information distribution system comprising:
a plurality of roadside apparatuses installed on a road;
a center apparatus configured to allow first distribution information and/or second distribution information to be wirelessly transmitted into a predetermined area via the roadside apparatus, the first distribution information including a division number preset to identify a road with the roadside apparatuses installed thereon, and the second distribution information including content information and execution condition information allowing the content information to be executed based on the first distribution information; and
a vehicle-mounted device, wherein the vehicle-mounted device has:
a communication unit configured to receive the first distribution information and the second distribution information transmitted by the roadside apparatus;
a storage unit configured to store the first distribution information and the second distribution information received by the communication unit;
an execution unit configured to execute an operation corresponding to the content information; and
a control unit configured to decide whether or not to execute the operation corresponding to the content information included in the second distribution information based on the execution condition information included in the second distribution information received by the communication unit, to allow the execution unit to execute the content information in accordance with a result of the decision.

2. The information distribution system according to claim 1, wherein the second distribution information includes the division number, and
the execution condition information allows the execution unit to execute the operation corresponding to the content information included in the second distribution information if the division number included in the second distribution information coincides with the division number included in the first distribution information stored in the storage unit before the second distribution information is stored.

3. The information distribution system according to claim 1, wherein the first distribution information includes a valid term for the division number included in the first distribution information,
the second distribution information includes the division number,
the execution condition information allows the execution unit to execute the content information included in the second distribution information if the division number included in the second distribution information coincides with the division number included in the first distribution information stored in the storage unit before the second distribution information is stored and if the valid term included in the first distribution information has not lapsed since the storage of the first distribution information in the storage unit, and
the control unit starts counting the valid term included in the first distribution information when the first distribution information is stored in the storage unit.

4. A vehicle-mounted device comprising:
a communication unit configured to receive first distribution information and second distribution information transmitted by a plurality of roadside apparatuses installed on a road, the first distribution information including a division number preset to identify a road with the roadside apparatuses installed thereon, and the second distribution information including content information and execution condition information allowing the content information to be executed based on the first distribution information;
a storage unit configured to store the first distribution information and the second distribution information received by the communication unit;
an execution unit configured to execute an operation corresponding to the content information; and
a control unit configured to decide whether or not to execute the operation corresponding to the content information included in the second distribution information based on the execution condition information included in the second distribution information received by the communication unit, to allow the execution unit to execute the content information in accordance with a result of the decision.

5. A vehicle-mounted device comprising:
a communication unit configured to receive first distribution information and second distribution information transmitted by a plurality of roadside apparatuses installed on a road, the first distribution information including a division number preset to identify a road with the roadside apparatuses installed thereon, and the second distribution information including content information and execution condition information allowing the content information to be executed based on the first distribution information;
a storage unit configured to store the first distribution information and the second distribution information received by the communication unit;
an execution unit configured to execute an operation of providing in audio the content information; and
a control unit configured to decide whether or not to execute the operation corresponding to the content information included in the second distribution information based on the execution condition information included in the second distribution information received by the communication unit, to allow the execution unit to execute the content information in accordance with a result of the decision.

* * * * *